US010740255B2

(12) United States Patent
Kitamura et al.

(10) Patent No.: US 10,740,255 B2
(45) Date of Patent: Aug. 11, 2020

(54) CONTROL APPARATUS, RELAY APPARATUS, CONTROL METHOD FOR CONTROL APPARATUS, CONTROL METHOD FOR RELAY APPARATUS, CONTROL PROGRAM AND STORAGE MEDIUM

(71) Applicant: OMRON Corporation, Kyoto (JP)

(72) Inventors: Yasuhiro Kitamura, Ritto (JP); Atsushi Kamimura, Ritto (JP); Masahiro Nishi, Ritto (JP); Toshikatsu Nakamura, Ritto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 15/486,308

(22) Filed: Apr. 13, 2017

(65) Prior Publication Data
US 2017/0300432 A1 Oct. 19, 2017

(30) Foreign Application Priority Data

Apr. 19, 2016 (JP) ................................. 2016-083988

(51) Int. Cl.
*G06F 13/16* (2006.01)
*G06F 13/40* (2006.01)
(Continued)

(52) U.S. Cl.
CPC .......... *G06F 13/16* (2013.01); *G05B 19/054* (2013.01); *G06F 13/4068* (2013.01); *G05B 19/4185* (2013.01)

(58) Field of Classification Search
CPC ... G06F 13/16; G06F 13/4068; G05B 19/054; G05B 19/4185
See application file for complete search history.

(56) References Cited

U.S. PATENT DOCUMENTS

| | | | | |
|---|---|---|---|---|
| 5,682,491 A | * | 10/1997 | Pechanek | G06F 9/3012 710/31 |
| 5,751,985 A | * | 5/1998 | Shen | G06F 9/3004 712/218 |

(Continued)

FOREIGN PATENT DOCUMENTS

| | | |
|---|---|---|
| EP | 2660670 | 11/2013 |
| JP | 2003067014 | 3/2003 |

(Continued)

OTHER PUBLICATIONS

"Office Action of European Counterpart Application," dated Oct. 16, 2018, pp. 1-5.

(Continued)

*Primary Examiner* — Eric T Oberly
(74) *Attorney, Agent, or Firm* — JCIPRNET

(57) ABSTRACT

Provided is a control apparatus that can correctly obtain the execution status information of the instruction whose sender is the control apparatus itself. The controller (3) controls operations of the IO-Link device (2) via the IO-Link master (1), and includes the writing part (300) transmitting an instruction for the IO-Link device (2) and an identification of the instruction to the IO-Link master (1) and the reading part (301) retrieving an execution status information (status) indicating the execution status of the instruction by using the identification information.

10 Claims, 7 Drawing Sheets

(51) Int. Cl.
  *G05B 19/05* (2006.01)
  *G05B 19/418* (2006.01)

(56) References Cited

U.S. PATENT DOCUMENTS

| | | | | |
|---|---|---|---|---|
| 5,862,404 | A * | 1/1999 | Onaga | G06F 3/1204 709/223 |
| 5,940,858 | A * | 8/1999 | Green | G06F 12/0864 711/139 |
| 6,373,585 | B1 * | 4/2002 | Mastie | G06F 3/1204 358/1.13 |
| 7,529,599 | B1 * | 5/2009 | Bhatt | B25J 9/1664 318/568.19 |
| 2003/0061380 | A1 * | 3/2003 | Saito | H04L 12/2803 709/238 |
| 2004/0148135 | A1 | 7/2004 | Balakrishnan et al. | |
| 2013/0198312 | A1 * | 8/2013 | Tamir | G06F 15/167 709/212 |
| 2014/0310435 | A1 * | 10/2014 | Gosh | G05B 19/0423 710/74 |
| 2015/0254909 | A1 | 9/2015 | Harata et al. | |

FOREIGN PATENT DOCUMENTS

| | | |
|---|---|---|
| JP | 2006516782 | 7/2006 |
| JP | 2014078801 | 5/2014 |
| JP | 2014-174616 | 9/2014 |

OTHER PUBLICATIONS

"Search Report of European Counterpart Application," dated Oct. 16, 2018, pp. 1-5.
"Search Report of Europe Counterpart Application", dated Sep. 27, 2017, p. 1-p. 7.
"Office Action of European Counterpart Application," dated Jun. 8, 2018, p. 1-p. 5.
Office Action of China Counterpart Application, with English translation thereof, dated Dec. 19, 2018, pp. 1-19.
Office Action of Europe Counterpart Application, dated Feb. 12, 2019, pp. 1-3.
"Office Action of Japan Counterpart Application", dated Jan. 7, 2020, with English translation thereof, p. 1-p. 4.
"Office Action of Europe Counterpart Application", dated Jun. 18, 2019, p. 1-4.

* cited by examiner

CONTROL APPARATUS, RELAY APPARATUS, CONTROL METHOD FOR CONTROL APPARATUS, CONTROL METHOD FOR RELAY APPARATUS, CONTROL PROGRAM AND STORAGE MEDIUM

CROSS-REFERENCE TO RELATED APPLICATION

This application claims the priority benefit of Japan application serial no. 2016-083988, filed on Apr. 19, 2016. The entirety of the above-mentioned patent application is hereby incorporated by reference herein and made a part of this specification.

BACKGROUND OF THE INVENTION

Field of the Invention

The disclosure relates to a control apparatus in a factory automation system and a relay apparatus that relays data between the control apparatus and a device.

Description of Related Art

A general FA (Factory Automation) system includes a master apparatus (control apparatus), a slave apparatus (relay apparatus) and a device such as a sensor. The master apparatus controls operations of the device and receives output data of the device via the slave apparatus. Improvement of such a FA system has been pursued from the past. For example, Patent Document 1 discloses technology to reduce the amount of data communication when the parameter settings of control equipment (corresponding to the abovementioned slave apparatus) are backed up in a PLC (Programmable Logic Controller, corresponding to the abovementioned master apparatus).

In such a FA system, when the master apparatus instructs the device, the master apparatus transmits an instruction to the slave apparatus and makes the slave apparatus relay the instruction. Then, the master apparatus confirms the execution status of the instruction by inquiring of the slave apparatus, and ends the instruction according to the confirmation result. As the instruction ends, the slave apparatus returns to the state in which a new instruction can be accepted.

PRIOR ART LITERATURE

Patent Literature

Patent Document 1: Japanese Patent Laid-Open No. 2014-174616 (published on Sep. 22, 2014).

SUMMARY OF THE DISCLOSURE

Here, in the FA system, other than the master apparatus, a display input device called a HMI (Human Machine Interface) and an apparatus called a support tool can also instruct the devices. Therefore, a concurrent instruction execution state in which multiple instructions are transmitted at once to the relay apparatus may occur. However, with abovementioned conventional technology, each instruction may not be executed correctly in such a situation because the concurrent execution of instructions is not considered. For example, in a case where the HMI transmits an instruction B to the slave apparatus after the master apparatus has transmitted an instruction A to the slave apparatus. In this case, the instruction B is not accepted when the slave apparatus accepted the instruction A. Thus, only the instruction A is executed, and the slave apparatus records the completion of the execution of the instruction. Here, the record indicates the completion of the execution of the instruction A. However, because the HMI can also refer to the record, the HMI misunderstands (misinterprets) that the execution of the instruction B is completed and ends the operation without the execution of the instruction B. Therefore, there has been a problem that the user needs to shift the timing of each instruction so that concurrent execution of instructions does not occur.

The present invention is finished in view of the problem, and provides a control apparatus and so on that can correctly obtain execution status information of the instruction whose sender is the control apparatus itself even multiple instructions are transmitted to a relay apparatus.

In order to solve the problem, a control apparatus according to the disclosure is a control apparatus (controller) that controls operations of a device (IO-Link device) connected to a relay apparatus (IO-Link master) via the relay apparatus, and includes an instruction part that transmits an instruction for the device and identification information of the instruction, and an execution confirmation part that retrieves execution status information (status) indicating the execution status of the instruction by using the identification information.

According to the above configuration, the instruction for the device and the identification information of the instruction are transmitted to the relay apparatus, and the execution status information indicating the execution status of the instruction is retrieved by using the identification information. Accordingly, it is possible to correctly retrieve the execution status information of the transmitted instruction even multiple instructions are transmitted to the single relay apparatus.

In the control apparatus according to the disclosure, the relay apparatus may have a function that makes the device execute an instruction written in a storage area corresponding to the device and writes the execution status information in the storage area. The instruction part may transmit the instruction and the identification information to the relay apparatus and makes the relay apparatus write the instruction and the identification information in the storage area. The execution confirmation part may transmit the identification information to the relay apparatus and retrieve the execution status information from the storage area.

According to the above configuration, the instruction and the identification information are transmitted to the relay apparatus and written in the storage area corresponding to the device which is the target of the instruction. The execution status information is retrieved from the storage area by transmitting the identification information to the relay apparatus. Therefore, it is possible to certainly retrieve the execution status information of the instruction transmitted by the control apparatus even another control apparatus has also transmitted an instruction to the relay apparatus. The abovementioned "another control apparatus" may be of the same type as the control apparatus or of a different type. For example, if the control apparatus is a PLC, the other control apparatus may also be a PLC or may be a HMI, a support tool, etc.

In the control apparatus according to the disclosure, the identification information may be information that is distinguishable from identification information of an instruction from another control apparatus.

According to the above configuration, the identification information to be transmitted is information distinguishable from identification information of an instruction from another control apparatus. Therefore, it is possible to retrieve the correct execution status information of the instruction transmitted by the relay apparatus even another control apparatus has transmitted an instruction to the relay apparatus before or after the timing at which the control part transmitted the instruction to the relay apparatus.

In the control apparatus according to the disclosure, the identification information may be information that is unique for each instruction transmitted by the instruction part.

According to the above configuration, since the identification information is unique for each instruction to be transmitted, it is possible to retrieve the correct execution status information for each instruction even the control part has transmitted multiple instructions.

In order to solve the problem, the relay apparatus according to the disclosure is a relay apparatus that relays an instruction between the control apparatus and a device that operates according to the instruction from the control apparatus. The relay apparatus includes a write management part that writes the instruction and an identification information of the instruction in a storage area corresponding to the device by way of correlating the instruction and the identification information of the instruction with each other, and also writes execution status information indicating the execution status of the instruction in the storage area, and a read management part that makes the control apparatus read the execution status information stored in the storage area in response to receiving the identification information from the control apparatus.

According to the above configuration, the instruction and the identification information of the instruction are written in the storage area corresponding to the device by way of correlating the instruction and the identification information of the instruction with each other, and the execution status information indicating the execution status of the instruction is written in the storage area. Then, in response to receiving the identification information from the control apparatus, the execution status information stored in the storage area is read by the control apparatus. Accordingly, it is possible to correctly read the execution status information of each instruction even multiple instructions are received.

The relay apparatus according to the disclosure may include a storage area releasing part that allows the write management part to write another instruction if the write management part writes a control information (CONTROL: NO PROCESSING) indicating that there is no processing to be executed by the relay apparatus for the instruction in the storage area, or if a predetermined period of time has passed without the control information is written.

Here, a conventional FA system is configured to be able to receive the next instruction after the instruction is terminated by the instruction sender apparatus. For example, in a FA system including a master apparatus, a slave apparatus and a device, when the master apparatus makes the device execute an instruction, the master apparatus transmits the instruction to the slave apparatus, and the slave apparatus relays the instruction to the device. Thereby, the device executes the instruction. Since the slave apparatus is informed that the instruction is executed, the master apparatus confirms the execution completion of the instruction by accessing the slave apparatus. After the confirmation is completed, the slave apparatus starts accepting the next instruction. Accordingly, the conventional FA system is unable to accept the next instruction until the master apparatus completes the confirmation of the execution completion of the instruction. Therefore, if a situation such as the communication between the master apparatus and the slave apparatus cannot be established occurs after the master apparatus transmits the instruction, the state in which the next instruction cannot be accepted remains unchanged.

Thereby, the abovementioned configuration according to the disclosure allows another instruction to be written in the storage area if the control information indicating that there is no processing to be executed by the relay apparatus for the instruction is written in the storage area, or if a predetermined period of time has passed without the control information is written. Therefore, the state in which another instruction cannot be written can be prevented because another instruction can be written not only if the control information is written but also if a predetermined period of time has passed without the control information is written.

The relay apparatus can also be described as a relay apparatus that relays an instruction between a control apparatus and a device that operates according to the instruction from the control apparatus, and includes a write management part that stores the instruction and identification information for distinguishing the instruction from instructions from other control apparatuses in the storage area corresponding to the device by way of correlating the instruction and the identification information with each other and also writes execution status information indicating the execution status of the instruction in the storage area, and a storage area releasing part that allows the write management part to write another instruction if the write management part writes a control information indicating that there is no processing to be executed by the relay apparatus for the instruction in the storage area, or if a predetermined period of time has passed without the control information is written.

In the relay apparatus according to the disclosure, when another instruction for the device is received while the instruction and the identification information are stored in the storage area, the write management part may store the another instruction and the identification information of the another instruction in another storage area corresponding to the device by way of correlating the another instruction and the identification information of the another instruction with each other, and write execution status information of the another instruction to the another storage area.

According to the above configuration, when another instruction for the device is received while the instruction and the identification information are stored in the storage area, the another instruction and the identification information of the another instruction are stored in another storage area corresponding to the device by way of correlating the another instruction and the identification information of the another instruction with each other. Then, the execution status information of the another instruction is written in the another storage area. Therefore, it is possible to concurrently accept multiple instructions for the same device.

In order to solve the problem, a control method for a control apparatus according to the disclosure is a control method for a control apparatus that controls operations of a device connected to a relay apparatus via the relay apparatus, and includes an instruction transmitting step for transmitting an instruction for the device and identification information of the instruction to the relay apparatus, and an execution confirmation step for retrieving execution status information indicating the execution status of the instruction by using the identification information. According to the method, the same effect as the abovementioned control apparatus is obtained.

In order to solve the problem, a control method for a relay apparatus according to the disclosure is a control method for a relay apparatus that relays an instruction between a control apparatus and a device operating according to the instruction from the control apparatus, and includes an instruction writing step for writing the instruction and the identification information of the instruction in a storage area corresponding to the device by way of correlating the instruction and the identification information of the instruction with each other, a status writing step for writing execution status information indicating the execution status of the instruction in the storage area, and a read control step for making the control apparatus read the execution status information stored in the storage area in response to receiving the identification information from the control apparatus. According to the method, the same effect as the abovementioned control apparatus is obtained.

The control apparatus according to each embodiment of the disclosure and the relay apparatus may be realized by a computer. In such a case, a control program for the control apparatus and the relay apparatus that realizes the control apparatus and the relay apparatus with a computer by operating the computer as the control apparatus and each part (software element) included in the relay apparatus, and a computer readable storage medium storing the control program fall in the scope of the present invention.

With the control apparatus according to an embodiment of the disclosure, it is possible to correctly retrieve the execution status information of an instruction transmitted from the control apparatus even multiple instructions have been transmitted to a single relay apparatus.

Also, with the relay apparatus according to an embodiment of the disclosure, it is possible to make the control apparatus correctly read the execution status information of each instruction even multiple instructions have been received.

DESCRIPTION OF THE EMBODIMENTS

First Embodiment

The first embodiment of the disclosure is described based on FIGS. 1 to 4 and TABLE 1.

[System Overview]

Figure 2:
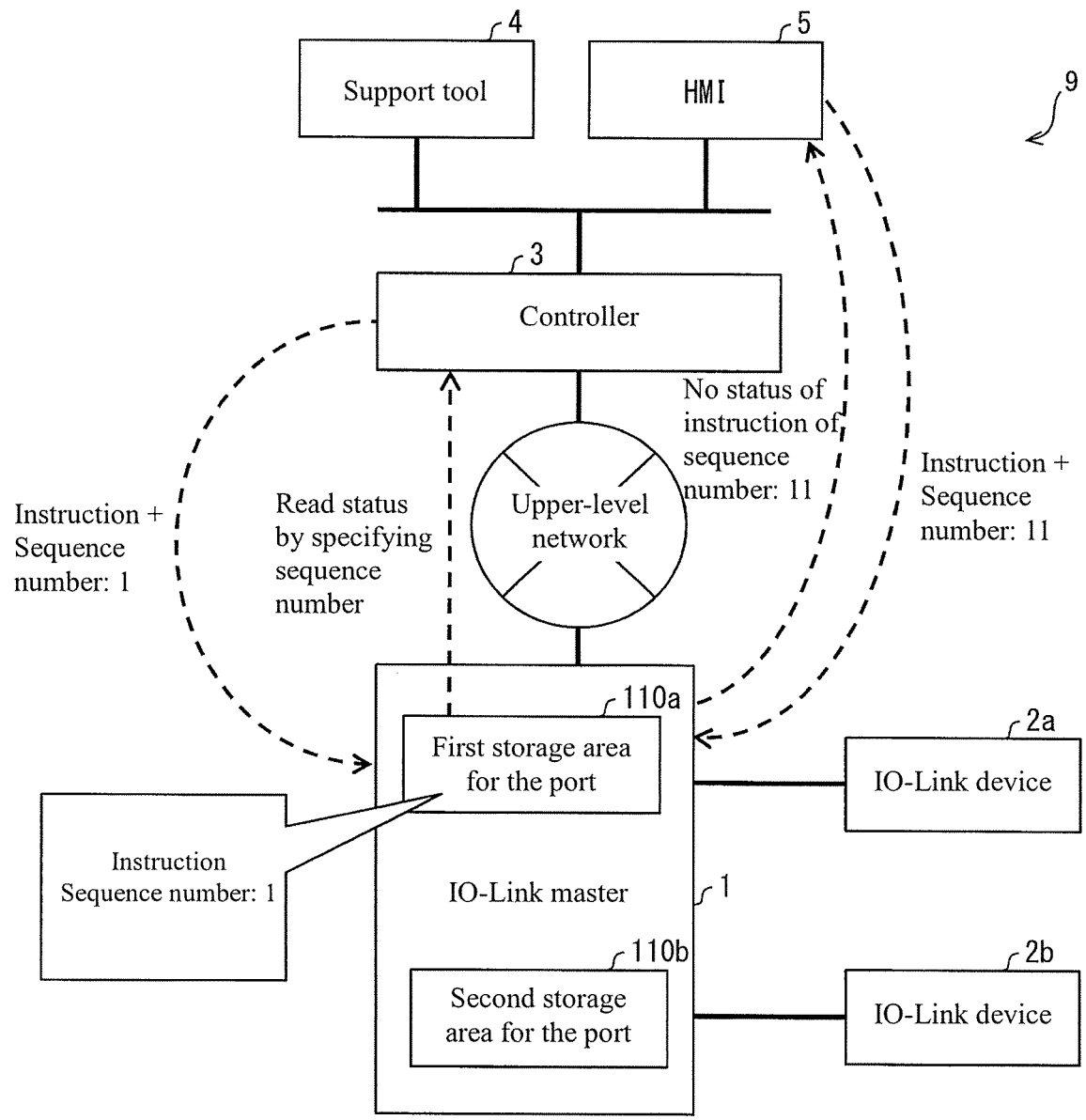
FIG. 2 is a diagram illustrating the overview of an IO-Link system including an IO-Link master.

Firstly, the overview of an IO-Link system of this embodiment is described based on FIG. 2. FIG. 2 is a diagram illustrating the overview of the IO-Link system 9. The IO-Link system 9 is a FA system, and, as depicted, the IO-Link system 9 includes an IO-Link master (relay apparatus) 1, an IO-Link device 2a, an IO-Link device 2b, a controller (control apparatus) 3, a support tool (control apparatus) 4 and a HMI (control apparatus) 5. The IO-Link device 2a and the IO-Link device 2b are described as an IO-Link device 2 if it is not necessary to differentiate these IO-Link devices.

The IO-Link master 1 is a relay apparatus that relays data between the IO-Link device 2 and the upper-level network including the controller 3, and operates as a slave apparatus of the controller 3 in the IO-Link system 9. In the depicted example, two IO-Link devices 2 are connected to the IO-Link master 1. However, it is possible to connect three or more IO-Link devices. Also, the IO-Link master 1 is capable of bidirectional communication with the IO-Link device 2.

The IO-Link device 2 is a device that is connected to the IO-Link mater 1 for communication and becomes the control target of the controller 3. A device of the output system type or a device of the input system type can be applied as the IO-Link device 2. The devices of the input system type can be, for example, various sensors such as a photoelectric sensor and a proximity sensor, and the devices of the output system type can be, for example, an actuator and a motor, etc. Also, a conversion device, etc. such as an inverter can be used as the IO-Link device 2.

The controller 3 is a control apparatus that integrally controls the entire IO-Link system 9, and also called a PLC (Programmable Logic Controller). The controller 3 operates as the master apparatus of the IO-Link mater 1 in the IO-Link system 9.

The support tool 4 is an apparatus that is connected to the IO-Link system 9 and used for various settings in the IO-Link system 9 such as the operation settings of the IO-Link device 2. The support tool 4 can be connected to the IO-Link system 9 via the controller 3. Because it is possible to perform the operation control of the IO-Link device 2 from the support tool 4, it can be said that the support tool 4 is also a kind of control apparatus. An information processing apparatus such as a personal computer can be used as the support tool 4, and a portable information processing apparatus such as a notebook computer can also be used.

The HMI 5 is a display input apparatus of a touch panel type, and the user of the IO-Link system 9 can control the controller 3 via the HMI 5 or can confirm the operation status of the IO-Link system 9 with the HMI 5. Because it is possible to perform the operation control of the IO-Link device 2 from the HMI 5, it can be said that the HMI 5 is also a control apparatus.

In the IO-Link system 9 having the above configuration, as depicted, a sequence number (identification information) is attached to a command (instruction) transmitted to the IO-Link master 1 from the controller 3 and the HMI 5 in this embodiment. In the example shown in FIG. 2, a sequence number "1" is attached to the command transmitted from the controller 3, and a sequence number "11" is attached to the command transmitted from the HMI 5.

Then, after receiving the command, to which the sequence number is attached, the IO-Link master 1 writes the command and the sequence number in a first storage area for the port 110a, and makes the IO-Link device 2a execute the instruction indicated by the command. A command for the IO-Link device 2*b* is written in a second storage area for the port 110*b*.

Also, the sequence number is specified when confirming the status of the instruction from the controller 3 or the HMI 5 during or after the execution of the instruction. Thereby, the IO-Link master 1 can return the status of the command corresponding to the sequence number rather than merely returning the command in execution or executed. Accordingly, it is possible to prevent the ill effect caused by receiving the status of a command transmitted by another apparatus. That is, in the depicted example, the controller 3 can receive the status of the instruction of the sequence number 1, and the HMI 5 can confirm that the status of the instruction of the sequence number 11 is not written and is not accepted.

In the IO-Link system 9, for each apparatus transmitting a command, a sequence number which can be used by the apparatus is predetermined. Thereby, it is possible to respectively distinguish a command transmitted by each apparatus. Specifically, in the depicted example, sequence numbers 1 to 9 are assigned to the controller 3, and sequence numbers 11 to 19 are assigned to the HMI 5. In the depicted example, commands are transmitted from the controller 3 and the HMI 5. However, any apparatus connectable to the IO-Link system 9 can be a sender of a command. For example, a command may be transmitted from the support tool 4. In this case, sequence numbers that the support tool 4 can use (20 to 29, for example) may be assigned.

As described above, the sequence number is a numerical value assigned as the identification information. By using a sequence number incremented by 1 for each transmission of a command, it is possible to distinguish each command transmitted by a particular apparatus. Also, as mentioned above, by dividing sequence numbers for each apparatus, it is possible to distinguish a command transmitted by each apparatus.

[IO-Link]

Supplemental explanation of the IO-Link is provided below. The IO-Link is standardized as "Single-drop digital communication interface for small sensors and actuators" (SDCI) in IEC61131-9. The IO-Link is a standardized technology for communication between the master, which is a control apparatus (the controller 3 corresponds thereto), and the device such as a sensor or an actuator. The IO-Link is a new point-to-point serial communication protocol used for communication between the master and the device. A photoelectric sensor and a proximity sensor are examples of the device.

The IO-Link differs from the conventional protocol which is only capable of transmitting the ON/OFF signal (1 bit) from the device to the master. The IO-Link is a communication protocol that is capable of receiving/transmitting 32-byte (256-bit) data (bidirectional communication). By connecting the master and the device with the IO-Link, the conventional signal from the device, which is used to be only the binary data such as ON/OFF information, can be obtained as 32-byte numerical value data. Therefore, from a photoelectric sensor, for example, information such as the received light quantity, the degree of the detection margin and the internal temperature can be obtained. Such information can be useful for investigating the causes of malfunction, and can be used for diagnosing product life and for changing the threshold value according to aging degradation.

By using the IO-Link, the settings and maintenances, etc. of the device can be automated, for example. Also, by using the IO-Link, the programming for the master can be greatly simplified, and, moreover, it is possible to realize the reduction in the cost of the distribution cable, etc.

Next, an IO-Link system using the IO-Link described above (corresponding to the IO-Link system 9) is described. The IO-Link system is configured with IO-Link devices (generally sensors, actuators, or a combination thereof; corresponding to the IO-Link device 2), standard three-wired sensor/actuator cables and an IO-Link master (corresponding to the IO-Link master 1).

The IO-Link master has one or more ports (corresponding to device communication ports 12 described later), and each port can connect a single IO-Link device. The IO-Link master performs point-to-point communication with the IO-Link device. The IO-Link master can transmit and receive not only the conventional binary data (1-bit data) such as ON/OFF information but also information excepting binary data (data that is greater than 1 bit) such as the identification information of the device, the communication property of the device, the device parameters and the process and diagnosis data to/from the IO-Link device.

The IO-Link device can transmit/receive data that is greater than 1 bit to/from the IO-Link device. Thus, the IO-Link device is a device adapted for the IO-Link. Also, it is possible to include devices such as sensors and actuators that are not IO-Link devices (not transmitting/receiving data greater than 1 bit) in the IO-Link system.

[Main Components of IO-Link Master]

Figure 1:
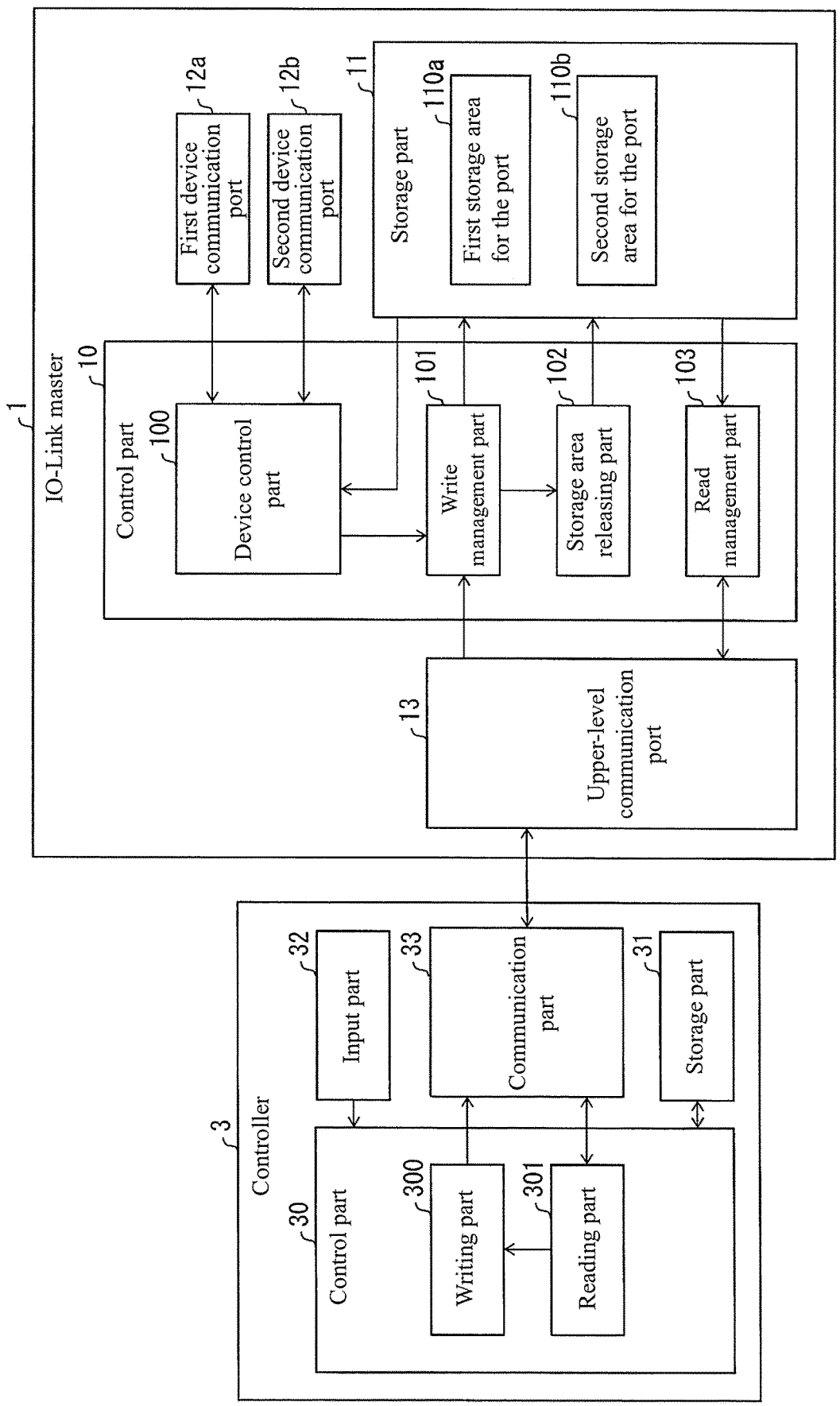
FIG. 1 is a block diagram illustrating an example of main components of an IO-Link master according to an embodiment of the disclosure.

Next, the main components of the IO-Link master 1 are described based on FIG. 1. FIG. 1 is a block diagram illustrating an example of main components of the IO-Link master 1. As depicted, the IO-Link master 1 includes a control part 10 that integrally controls each part of the IO-Link master 1 and a storage part 11 that stores various data used by the IO-Link master 1. Also, the IO-Link master 1 includes the first device communication port 12*a* and the second device communication port 12*b* as communication ports for communicating with the IO-Link devices 2. Further, the IO-Link master 1 includes an upper-level communication port 13 for communicating with the upper-level network including the controller 3. The first device communication port 12*a* and the second device communication port 12*b* are described as a device communication port 12 if it is not necessary to differentiate these device communication ports. Also, the number of the device communication port 12 may be greater than or equal to three. The communication with the upper-level network via the upper-level communication port 13 may be performed by using EtherCAT (Ethernet Control Automation Technology: Registered Trade Mark), etc.

The control part 10 includes a device control part 100, a write management part 101, a storage area releasing part 102 and a read management part 103. The storage part 11 includes a first storage area for the port 110*a* and a second storage area for the port 110*b*. The first storage area for the port 110*a* and the second storage area for the port 110*b* are described as a storage area for the port 110 if it is not necessary to differentiate these storage areas. The details of the data stored in the storage area 110 are described later.

The device control part 100 controls the operations of the IO-Link device 2. For example, the device control part 100 transmits a command of a predetermined format, which is called a message, to the IO-Link device 2 so as to make the IO-Link device 2 execute the operation described in the message, and retrieves the execution result from the IO-Link device 2. The message is generated based on the data written in the storage area for the port 110 (the details are described later).

The write management part 101 writes a command transmitted from a control apparatus such as the controller 3, the support tool 4 and the HMI 5 and a sequence number in the storage area for the port 110 by way of correlating the command with the sequence number. Also, the write management part 101 writes a status (execution status information) indicating the execution status of the command in the storage area for the port 110. As described above, whether to write in the first storage area for the port 110a or in the second storage area for the port 110b depends on which storage area the IO-Link device 2 executing the command corresponds to.

When a control information indicating that there is no processing needed to be executed by the IO-Link master 1 for the command ("NO PROCESSING", which is described later) is written in the storage area for the port 110, the storage area releasing part 102 allows another command to be written in the corresponding storage area for the port 110. The storage area releasing part 102 also allows another command to be written in the corresponding storage area for the port 110 when a predetermined period of time has passed without the control information is written.

In response to a status query regarding the execution status of the command, the read management part 103 read the execution status of the command (written in the storage area for the port 110) correlated with the sequence number included in the query.

The storage area for the port 110 is a storage area disposed for each device communication port 12, and stores data related to each device communication port 12. Specifically, in the first storage area for the port 110a, the command to the IO-Link device 2a and the sequence number thereof is written as the data related to the first device communication port 12a. In the same manner, in the second storage area for the port 110b, the command to the IO-Link device 2b and the sequence number thereof is written as the data related to the second device communication port 12b. The details of the data written in the storage area for the port 110 are described later based on TABLE 1.

[Main Components of the Controller]

Next, the main components of the controller 3 are described based on FIG. 1. As depicted, the controller 3 includes a control part 30 that integrally controls each part of the controller 3, a storage part 31 that stores various data used by the controller 3, an input part 32 that accepts the input to the controller 3, and a communication part 33 for communicating with other devices such as the IO-Link master 1, the support tool 4 and the HMI 5. The control part 30 includes a writing part (instruction part) 300 and a reading part (execution confirmation part) 301.

The writing part 300 transmits the command (instruction) for the IO-Link device 2 and the sequence number to the IO-Link master 1, and makes the IO-Link master 1 write the command and the sequence number in the storage area for the port 110. As described above, the sequence numbers the controller 3 can use are predetermined, and the writing part 300 transmits these predetermined sequence numbers. More specifically, a sequence number assigned to the controller 3 is incremented by 1 at every transmission of a command and then used. For example, if the sequence number of the first transmitted command is 1, the writing part 300 sets the sequence number 2 to the next command. Thereby, it is possible to prevent an occurrence of misretrieval among the commands the controller 3 has transmitted because a different sequence number is set to each instruction to be transmitted.

The reading part 301 retrieves the status of the command transmitted by the writing part 300 from the IO-Link master 1 by specifying the sequence number.

The support tool 4 and the HMI 5 also have components similar to the writing part (instruction part) 300 and the reading part (execution confirmation part) 301. Thereby, the support tool 4 and the HMI 5 can perform the operation control of the IO-Link device 2 via the IO-Link master 1.

[Data Structure of the Data Stored in the Storage Area for the Port]

Next, referring to TABLE 1, the data structure of the data stored in the storage area for the port 110 (data used for transmitting the message addressed to the IO-Link device 2) is described. TABLE 1 is a diagram illustrating the data structure of the data stored in the storage area for the port 110. As depicted, the data stored in the storage area for the port includes ENTRY NUMBER, CONTROL, STATUS, INDEX, SUB-INDEX, DATA LENGTH, DATA, ERROR CODE and SEQUENCE NUMBER.

TABLE 1

| Message to device of port 1 | ENTRY NUMBER | Entry number |
|---|---|---|
| | CONTROL | 0: NO PROCESSING |
| | | 1: WRITE |
| | | 2: READ |
| | STATUS | 0: OPERATION HALTED |
| | | 1: BUSY |
| | | 2: SUCCESS |
| | | 3: ERROR |
| | INDEX | Index of object IO-Link device has |
| | SUB-INDEX | Sub-index of object IO-Link device has |
| | DATA LENGTH | Data length of read/write data (in BYTE) |
| | DATA | Read/write data |
| | ERROR CODE | |
| | TIMEOUT | Monitoring time period of IO-Link master for response from IO-Link device |
| | SEQUENCE NUMBER | Sequence number of message |

The ENTRY NUMBER indicates the entry number. The CONTROL indicates the content of the control the IO-Link master needs to execute, which is "0: NO PROCESSING", "1: WRITE" or "2: READ" here.

The STATUS indicates the execution status of the command, which is "0: OPERATION HALTED", "1: BUSY (EXECUTING PROCESSING)" or "3: ERROR" here.

The INDEX and the SUB-INDEX are the index and the sub-index of the object the IO-Link device 2 has.

The DATA is the data which is subject to reading or writing (read/write data), and the DATA LENGTH indicates the data length of the data. The ERROR CODE indicates the type of the error occurred.

The TIMEOUT is the timeout period, and, specifically, is the monitoring period of the response from the IO-Link device 2 at the IO-Link master 1. The SEQUENCE NUMBER is for identifying the message (command) as described above.

[State Transition of the IO-Link Master]

Figure 3:
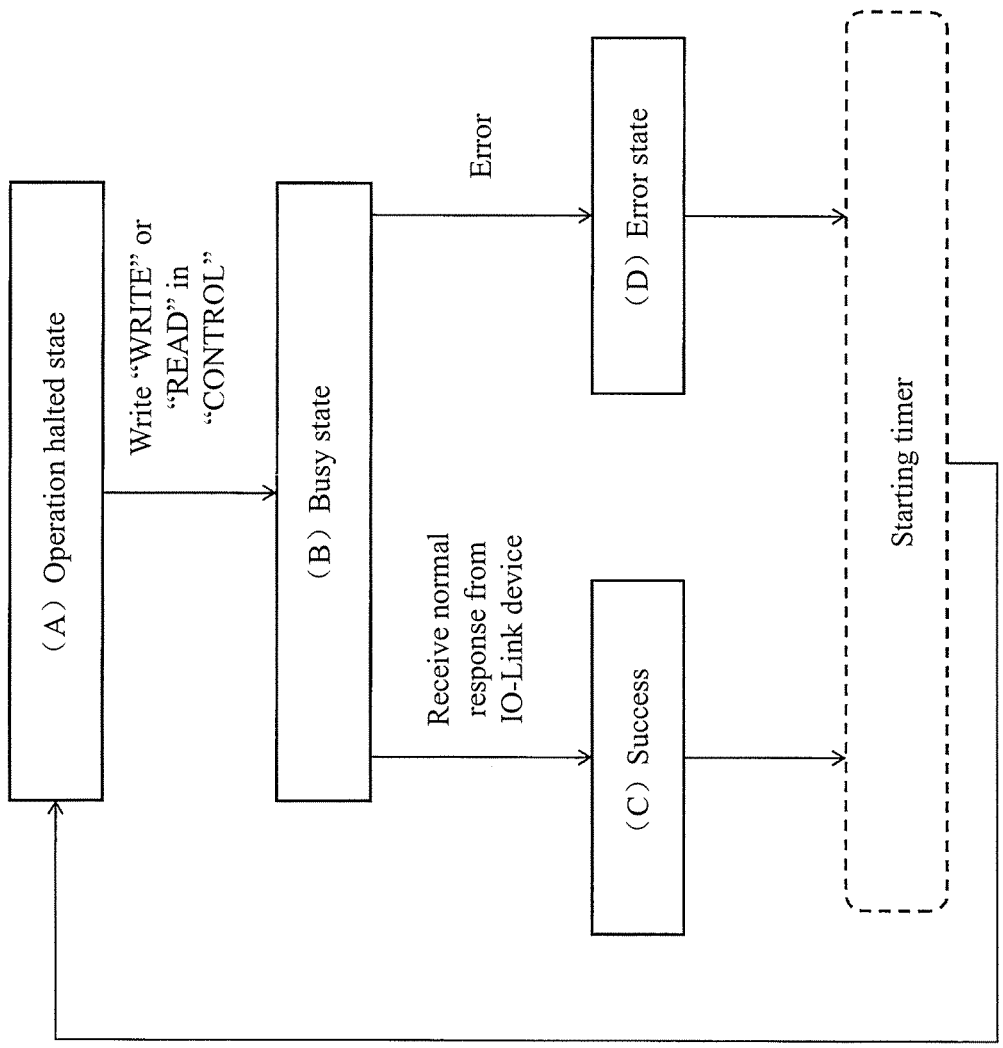
FIG. 3 is a diagram describing the state transition of the data stored in the storage area 110 for the port.

Next, the state transition of the data stored in each storage area for the port 110 is described based on FIG. 3. FIG. 3 is a diagram describing the state transition of the data stored in the storage area for the port 110.

(A) Operation Halted State

In the operation halted state, the "STATUS" of every data stored in the storage area for the port 110 is 0.

(B) Busy State

In the operation halted state of (A), the "STATUS" of the storage area for the port 110 is rewritten to "1" (BUSY) when "WRITE" or "READ" is written to the "CONTROL" in the storage area for the port 110.

Also, the "STATUS" is rewritten to "1" (BUSY) in storage areas for the port 110 in which "WRITE" or "READ" is not written to the "CONTROL". The busy state in this case is resolved when the "CONTROL" of the storage area for the port 110 in which "WRITE" or "READ" is written is updated to "NO PROCESSING". That is, when the "CONTROL" of a storage area for the port 110 becomes "NO PROCESSING", the "CONTROL" of all the other storage areas for the port 110 becomes "NO PROCESSING" in an interlocking manner. The transition to the busy state in this case is not essential. That is, even "WRITE" or "READ" is written in the "CONTROL" in one storage area for the port 110, the other storage areas for the port may be "NO PROCESSING". In this case, multiple commands can be accepted concurrently if the device communication port 12 to be the transmission target of the command is different.

(C) Success

After the busy state of (B), the "STATUS" is rewritten to "2" (SUCCESS) if a normal response is received from the IO-Link device 2. Here, a response whose status of the execution result is "NORMAL" is called the normal response. Also, a response whose status of the execution result of the command is other than "NORMAL" (ERROR, etc.) is called the abnormal response.

(D) Error State

On the contrary, after the busy state of (B), if the normal response from the IO-Link device 2 is not received and the IO-Link master 1 determined as an error, the "STATUS" is rewritten to "3" (ERROR). Also, after the busy state of (B), if an error response (abnormal response) is received from the IO-Link device 2, the "STATUS" is rewritten to "3".

Then, the storage area releasing part 102 of the IO-Link master 1 starts clocking a timer at the moment of the (C) Success state or the (D) Error state. If the write management part 101 writes "NO PROCESSING" to the "CONTROL" before the timer times out, the state transitions to (A). Also, if the timer timed out, the storage area releasing part 102 makes the write management part 101 write "NO PROCESSING" to the "CONTROL", and the state transitions to (A). As mentioned above, when the "CONTROL" of a storage area for the port 110 that has become the cause of the Busy state becomes "NO PROCESSING", the "CONTROL" of the other storage area for the port 110 is also rewritten to "NO PROCESSING".

[Processing Flow of the IO-Link System]

Figure 4:
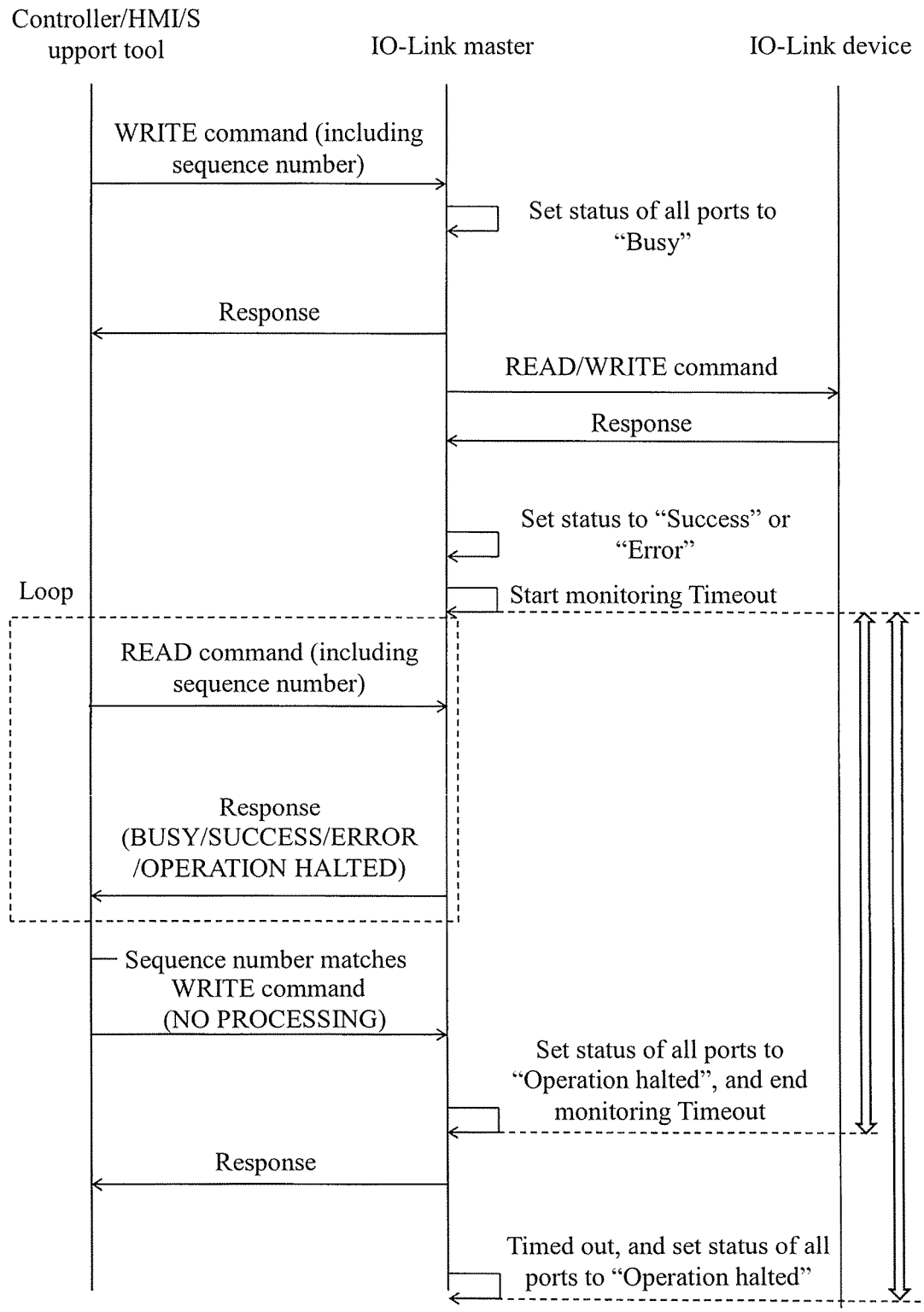
FIG. 4 is a sequence diagram illustrating the flow of processing in the IO-Link system.

Next, the flow of processing (the control method for the control apparatus and the control method for the relay apparatus) in the IO-Link system 9 is described based on FIG. 4. FIG. 4 is a sequence diagram illustrating the flow of processing in the IO-Link system 9. An example that the controller 3 transmits the command is described below. However, the processing in a case where the support tool 4 or the HMI 5 transmits the command is also the same.

First, the writing part 300 of the controller 3 transmits a write commend (instruction) to the IO-Link master 1 (instruction transmitting step). The write command includes information indicating the device communication port 12 which is the target of the command. The write command also includes parameters such as CONTROL (READ or WRITE), INDEX, SUB-INDEX, DATA LENGTH, DATA, TIMEOUT and SEQUENCE NUMBER, etc. to be written in the storage area for the port 110.

In the IO-Link master 1 which has received the write command, the write management part 101 writes the data and the parameters in the storage area for the port 110 corresponding to the device communication port 12 which is the target of the command (instruction writing step). Also, the "STATUS" of all the storage areas for the port 110 is rewritten to "BUSY". Then, if the writing completes normally, the writing part 300 transmits the normal response to the controller 3. If the writing does not complete normally, the writing part 300 transmits the abnormal response to the controller 3.

The device control part 100 generates a message for executing the operation indicated by the parameters based on CONTROL (READ or WRITE), INDEX, SUB-INDEX, DATA LENGTH and DATA written in the storage area for the port 110. If the value of the control is READ, a message that is the read command is generated. If the value of the control is WRITE, a message that is the write command is generated. Then, the device control part 100 transmits the message (the write command or the read command) to the IO-Link device 2. The device control part 100 may start monitoring the timeout written in the storage area for the port 110.

The IO-Link device 2 which has received the message returns a response of the read, the write or the error (abnormal response) to the IO-Link master 1 to reply the message.

The device control part 100 of the IO-Link master 1 sets the "STATUS" as "SUCCESS" or "ERROR" according to the response. The writing of the "STATUS" (status writing step) is performed by the write management part 101 according to the control from the device control part 100. Also, as interlocking with the writing of the "STATUS", the storage area releasing part 102 starts monitoring the timeout.

In the controller 3 which has transmitted the write command and received the normal response thereto, the reading part 301 repeats a processing that transmits the read command to the IO-Link master 1 (execution confirmation step) and receives the response, until receiving the normal response in which the "STATUS" is a predetermined value (loops). Specifically. the reading part 301 transmits the read command including the same sequence number as the write command transmitted before to the IO-Link master 1, so as to request the reading of the value of the "STATUS". Then, the reading part 301 receives the normal response to the read command. If the value of the "STATUS" included in the normal response is "SUCCESS" or "ERROR", the processing exits the loop. On the contrary, if the value is "BUSY", the read command is transmitted again. If the value is "OPERATION HALTED", the processing is terminated. If the abnormal response is received, the processing is also terminated. These are abnormal end cases.

In a case where the processing exits the loop, the reading part 301 instructs the writing part 300 to rewrite the value of the "CONTROL" to "NO PROCESSING" after confirming that the sequence number of the write command transmitted before and the sequence number of the read command are the same. Then, the writing part 300 which received the instruction transmits a write command for rewriting the value of the "CONTROL" to "NO PROCESSING" to the IO-Link master 1. The command ends normally when a normal response is received in response to the write command. The processing also ends if an abnormal response is received, but this is the abnormal end case.

In the IO-Link master 1, the read management part 103 accepts the read command transmitted from the controller 3. Then, the read management part 103 reads the value of the "STATUS" corresponding to the sequence number included in the read command from the storage area for the port 110 and notifies the controller 3 (read control step).

After that, if the write command for rewriting the value of the "CONTROL" to "NO PROCESSING" is received before the timeout occurs, the write management part 101 rewrites the "STATUS" of all the storage areas for the port 110 to "OPERATION HALTED". Then, the storage area releasing part 102 ends monitoring the timeout. If the timeout occurs without receiving the write commend, the storage area releasing part 102 makes the write management part 101 rewrite the "STATUS" of all the storage areas for the port 110 to "OPERATION HALTED".

Second Embodiment

Figure 5:
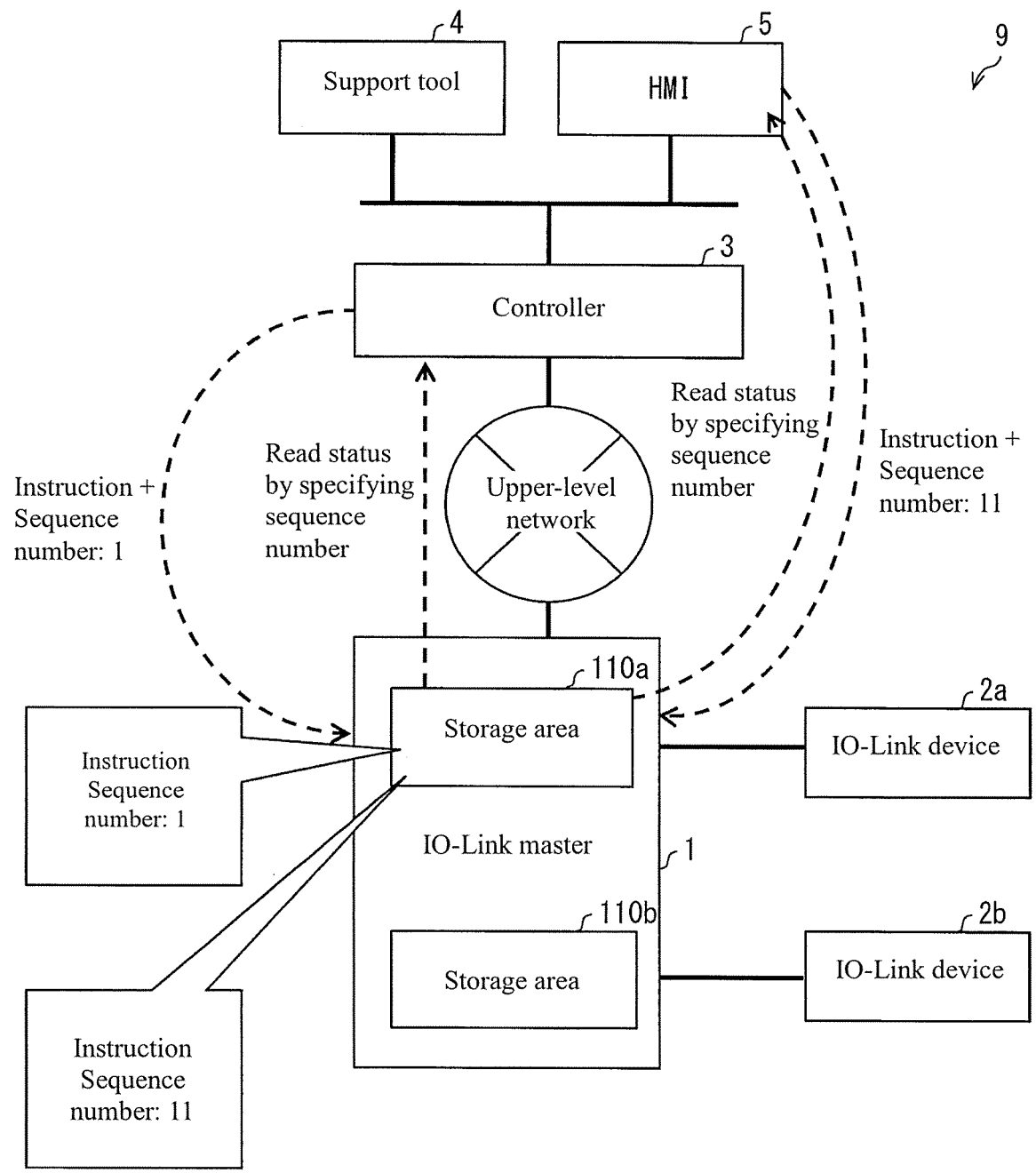
FIG. 5 is a block diagram illustrating a summary of the IO-Link system capable of storing multiple commands in the storage area for the port.

The second embodiment of the disclosure is described based on FIG. 5. For convenience of explanation, the same reference numeral is assigned to a component having the same function as the component described in the first embodiment, and the description thereof is omitted.

FIG. 5 is a block diagram illustrating a summary of the IO-Link system capable of storing multiple commands in the storage area for the port 110.

In the first embodiment, the number of commands (instructions) can be written in the storage area for the port 110 is one. Therefore, once a command is written, the state of "BUSY" continues and another command cannot be written until the "CONTROL" of the command becomes "NO PROCESSING".

This embodiment can write multiple commands in the storage area for the port 110. That is, in this embodiment, multiple storage area is set up inside one storage area for the port 110, and the parameters shown in TABLE 1 can be written in each storage area. When the write management part 101 of this embodiment receives another command to the IO-Link device 2 while a command is already stored in the storage area for the port 110a, the write management part 101 writes the another command in another storage area of the storage area for the port 110a. Thereby, the next command can be accepted even a command whose processing is not completed yet is remaining, and the possibility of the occurrence of the Busy state can be reduced. Since a sequence number is written in each command as a parameter, misretrieval of the command does not occur.

Third Embodiment

Figure 6:
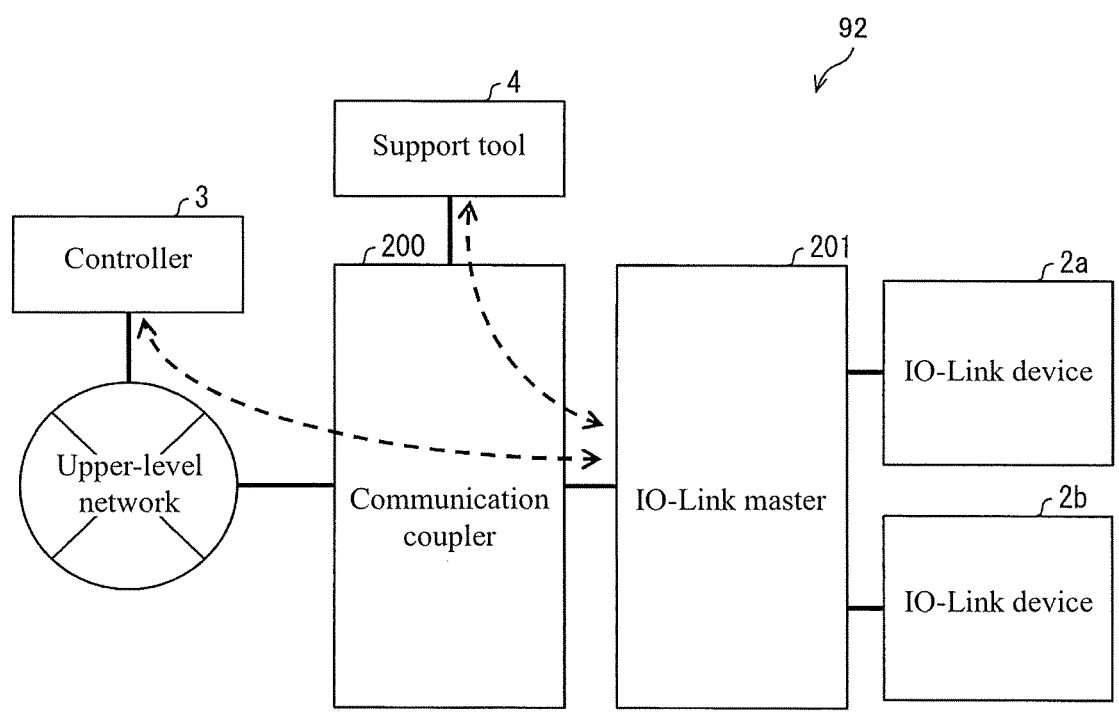
FIG. 6 is a diagram illustrating an example of the IO-Link system from which the communication function to the upper-level network in the IO-Link master is separated as a communication coupler.

The third embodiment of the disclosure is described based on FIG. 6. FIG. 6 is a diagram illustrating an example of the IO-Link system 92 from which the communication function to the upper-level network in the IO-Link master is separated as a communication coupler.

The depicted IO-Link system 92 is a system having the same function as the IO-Link system 9. However, the IO-Link system 92 differs from the IO-Link system 9 as the IO-Link system 92 includes a communication coupler 200 and an IO-Link master (relay apparatus) 201 instead of the IO-Link master 1 of the IO-Link system 9.

The communication coupler 200 is a relay apparatus that relays communication between the upper-level network and the IO-Link master 201. The communication coupler 200 includes a communication port corresponding to the upper-level communication port 13 of the IO-Link master 1 (refer to FIG. 1) and a communication port for communicating with the IO-Link master 201 as well. The communication coupler 200 includes a communication control part that is capable of communicating with the upper-level network of the IO-Link master 201 and relays communication between an apparatus included in the upper-level network and the IO-Link master 201 by the communication control part.

The IO-Link master 201 has the same configuration as the IO-Link master 1 except that the IO-Link master 201 includes the communication port for communicating with the communication coupler 200 instead of the upper-level communication port 13 (refer to FIG. 1). In the IO-Link system 92, writing in the storage area for the port 110 from the controller 3 and reading from the storage area for the port 110 can be performed as the same as the IO-Link system 9. However, the communication in those cases is performed via the communication coupler 200.

If the communication coupler 200 has an interface for connecting the support tool 4, as shown in FIG. 6, the support tool 4 can communicate with the IO-Link master 201 without using the controller 3 by connecting to the communication coupler 200 via the interface. If the IO-Link master 201 has an interface for connecting the support tool 4, the support tool 4 can directly communicate with the IO-Link master 201 via the interface.

Fourth Embodiment

Figure 7:
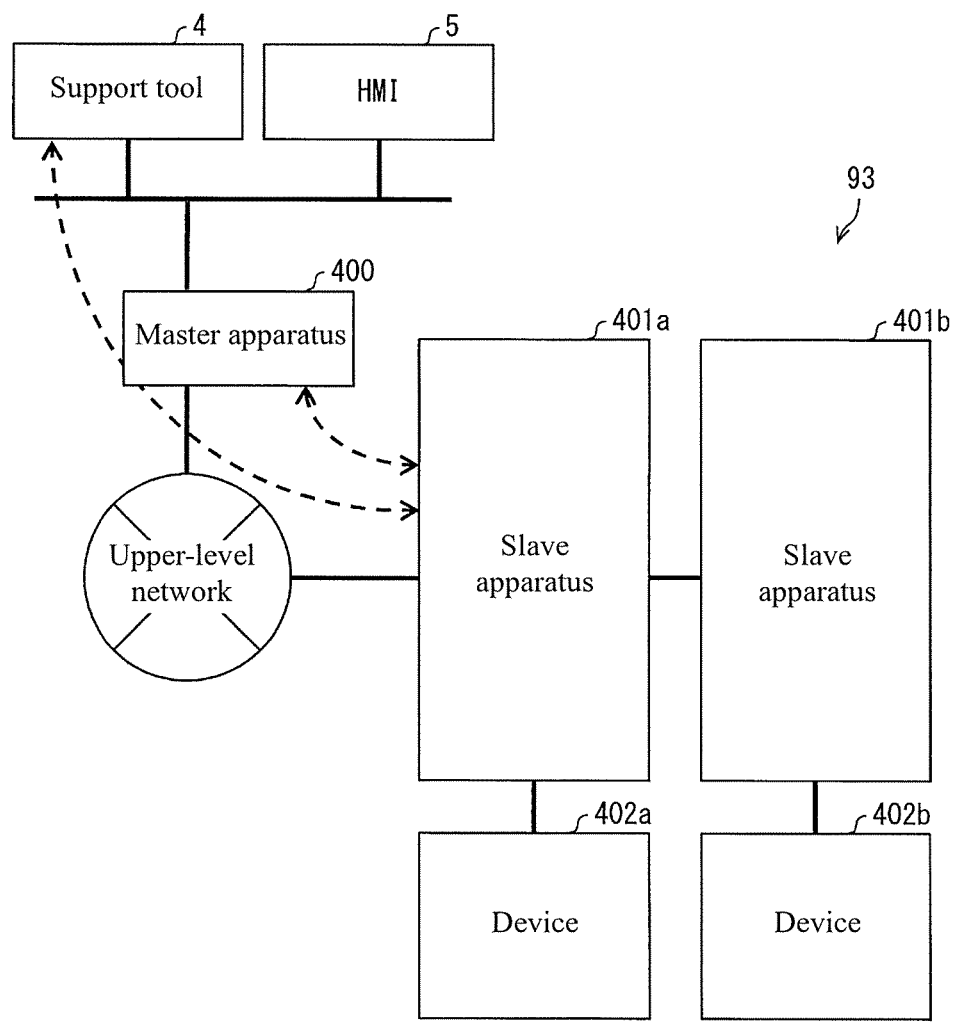
FIG. 7 is a diagram illustrating an example of the FA system including multiple slave apparatuses and a master apparatus controlling the multiple slave apparatuses.

The fourth embodiment of the disclosure is described based on FIG. 7. FIG. 7 is a diagram illustrating an example of a FA system 93 including multiple slave apparatuses and a master apparatus controlling the multiple slave apparatuses. The depicted FA system 93 has the same function as the IO-Link system 9, but the FA system 93 is not a system conforming to the IO-Link protocol. The FA system 93 includes a master apparatus 400, slave apparatuses 401a and 401b and devices 402a and 402b as depicted. The slave apparatuses 401a and 401b are described as a slave apparatus 401 if it is not necessary to differentiate these slave apparatuses. In the same way, the devices 402a and 402b are described as a device 402 if it is not necessary to differentiate these devices.

The master apparatus 400 is a control apparatus controlling the slave apparatus 401 and is an apparatus corresponding to the controller 3 in the previous embodiments. The slave apparatus 401 is an apparatus that operates according to the control from the master apparatus 400 and is a relay apparatus that relays data between the master apparatus 400 and the devices 402. The slave apparatus 401 is an apparatus corresponding to the IO-Link master 1 in the previous embodiments and is capable of bidirectional communication with the device 402. A difference between the IO-Link master 1 and the slave apparatus 401 is that the number of the communication port the slave apparatus 401 has for communicating with the device 402 is one. The device 402 corresponds to the IO-Link devices 2 in the previous embodiments, and, for example, excepting for a device of the input type such as a sensor, a device of the output type such as an actuator also can be applied as the device 402. Such a system can be established by using EtherCAT, for example.

As the same as the IO-Link master 1, the slave apparatus 401 includes a write management part that writes a command and a sequence number n the storage area for the port by way of correlating the command with the sequence number, and writes a status (execution status information) indicating the execution status of the command in the storage area for the port, a storage area releasing part that allows the write management part to write another command in the storage area for the port, and a read management part that reads the execution status of the command from the storage area for the port and notifies of the execution status.

The slave apparatus 401 includes a write management part 101 that writes a command and a sequence number in a storage area for the port by way of correlating the command with the sequence number, and writes the status of the command in the storage area for the port, and a read management part 103 that reads the status stored in the storage area for the port in response to receiving the sequence number from the master apparatus 400. Further, the slave apparatus 401 includes a storage area releasing part 102 that allows the write management part 101 to write another command in the storage area for the port 110 if the write management part 101 writes "NO PROCESSING" to the "CONTROL" of the command or if a predetermined time period has passed (the timeout of (C) occurs) without "NO PROCESSING" is written.

As the same as the controller 3, the master apparatus 400 includes a writing part 300 that transmits the command for the device 402 and the sequence number to the slave apparatus 401, and a reading part 301 that retrieves the status of the command by using the sequence number.

Accordingly, the same effect as the IO-Link system 9 of the previous embodiments is obtained. In this embodiment, multiple storage areas for multiple commands may also be disposed in a single storage area for the port 110 as the same as the second embodiment.

VARIATIONS

Each of the previous embodiments describes an example that the apparatuses (control apparatuses) which are the senders of the command, such as the controller 3, the support tool 4 and the HMI 5, decide the sequence number. However, the IO-Link master 1 may decide the sequence number. In this case, the IO-Link master 1 which received a command assigns a sequence number to the command, and notifies the apparatus of the senders which transmitted the command of the assigned sequence number. Such a configuration can also realize the same function as each of the previous embodiments.

Each of the embodiments describes an example that the sequence number is used as the identification information of the command, but the identification information is not limited to the sequence number. The identification information may be any information that can identify a particular command.

[Implementation by Software]

The control block of the IO-Link master 1 and the controller 3 (especially each part included in the control part 10 and the control part 30) may be realized by a logic circuit (hardware) formed in an integrated circuit (IC chip), or by software by using a CPU (Central Processing Unit).

In the latter case, the IO-Link master 1 and the controller 3 include a CPU that executes instructions of the program which is the software realizing each function, a ROM (Read Only Memory) or a storage apparatus (referred to as a "storage medium") in which the program and various data are stored so as to be readable by the computer (or the CPU), a RAM (Random Access Memory) that extracts the program, etc. The computer (or the CPU) reads the program from the storage medium and then executes the program. Thereby, the objective of the disclosure is achieved. A "non-transitory tangible medium" such as a tape, a disk, a card, a semiconductor memory and a programmable logic circuit can be used as the storage medium. The program may be provided to the computer via an arbitrary transmission medium that is capable of transmitting the program (such as a communication network or a broadcast wave). The disclosure can be realized as a form of data signals embedded in the carrier wave that embody the program by electronic transmission. The control block of an apparatus such as the IO-Link master 201, the communication coupler 200, the master apparatus 400 and the slave apparatus 401 can be realized in the same way.

The present invention is not limited to each of the above mentioned embodiments, and various modifications are possible within the scope indicated in the claims. An embodiment obtained by combining technical means disclosed respectively in different embodiments is included within the technical scope of the present invention.

What is claimed is:

1. A system, comprising:
a relay apparatus, connected to a device; and
a plurality of control apparatuses, comprising a first control apparatus and a second control apparatus, configured to control operations of the device connected to the relay apparatus via the relay apparatus, wherein each of the first control apparatus and the second control apparatus respectively comprises:
an instruction part that transmits a plurality of instructions for the device and identification information of the instructions to the relay apparatus, and
an execution confirmation part that retrieves execution status information indicating an execution status of the instructions by using the identification information,
wherein the identification information is unique for each of the instructions transmitted by the instruction part,
wherein the identification information transmitted by the instruction part of the first control apparatus comprise a first sequence number selected from a plurality of first sequence numbers which are assigned to the first control apparatus, and
the identification information transmitted by the instruction part of the second control apparatus comprises a second sequence number selected from a plurality of second sequence numbers which are assigned to the second control apparatus, wherein the first sequence numbers are different from the second sequence numbers,
the first sequence number is indicated by the execution confirmation part of the first control apparatus when retrieving the execution status of a first instruction from the first control apparatus during or after the execution of the first instruction, and the second sequence number is indicated by the execution confirmation part of the second control apparatus when retrieving the execution status of a second instruction from the second control apparatus during or after the execution of the second instruction.

2. The control apparatus according to claim 1, wherein the relay apparatus has a function that makes the device execute an instruction written in a storage area corresponding to the device and writes the execution status information in the storage area, and
the instruction part transmits the instructions and the identification information to the relay apparatus and makes the relay apparatus write the instructions and the identification information in the storage area, and the execution confirmation part transmits the identification information to the relay apparatus and retrieves the execution status information from the storage area.

3. The control apparatus according to claim 1, wherein the identification information of an instruction from the first control apparatus is distinguishable from identification information of an instruction from the second control apparatus.

4. A non-transitory computer readable medium storing a control program for making a computer function as each of the plurality of the control apparatuses according to claim 1, and being computer-readable, the control program makes a computer function as the instruction part and the execution confirmation part.

5. A relay apparatus that relays a plurality of instructions between a plurality of control apparatuses and a device operating according to the instruction from the plurality of control apparatuses that comprise a first control apparatus and a second control apparatus, the relay apparatus comprising:
a write management part that writes the instructions and identification information of the instructions in a storage area corresponding to the device by way of correlating the instructions and the identification information of the instructions with each other, and also writes execution status information indicating an execution status of the instructions in the storage area, and
a read management part configured to read the execution status information stored in the storage area in response to receiving a first command for retrieving the execution status information from the first control apparatus, and read the execution status information stored in the storage area in response to receiving a second command for retrieving the execution status information from the second control apparatus,
wherein the identification information is unique for each of the instructions, when the relay apparatus receives the first command for retrieving the execution status information from the first control apparatus, wherein the first command comprises a first sequence number selected from a plurality of first sequence numbers which are assigned to the first control apparatus, the first sequence number is specified when confirming the execution status of the instruction from the first control apparatus during or after the execution of the instruction, the relay apparatus is configured to transmit the execution status information corresponding to the first sequence number to the first control apparatus, and
when the relay apparatus receives the second command for retrieving the execution status information from the second control apparatus, wherein the second command comprises a second sequence number selected from a plurality of second sequence numbers which are assigned to the second control apparatus, the sequence number is specified when confirming the execution status of the instruction from the second control apparatus during or after the execution of the instruction, the relay apparatus is configured to transmit the execution status information corresponding to the second sequence number to the second control apparatus.

6. The relay apparatus according to claim 5, further comprising:
a storage area releasing part that allows the write management part to write another instruction in the storage area if the write management part writes control information indicating that there is no processing to be executed by the relay apparatus for the instructions in the storage area, or if a predetermined period of time has passed without the control information is written.

7. The relay apparatus according to claim 5, wherein in a case where the write management part receives another instruction for the device while the instructions and the identification information are stored in the storage area, the write management part stores the another instruction and identification information of the another instruction in another storage area corresponding to the device by way of correlating the another instruction and the identification information of the another instruction with each other, and then writes the execution status information of the another instruction in the another storage area.

8. A non-transitory computer readable medium storing the control program for making a computer function as the relay apparatus according to claim 5, and being computer-readable, wherein the control program makes a computer function as the write management part and the read management part.

9. A control method for a plurality control apparatuses that control operations of a device connected to a relay apparatus via the relay apparatus, the plurality of control apparatuses comprises a first control apparatus and a second control apparatus that respectively comprises an execution confirmation part, the control method comprising:
an instruction transmitting step for transmitting a plurality of instructions for the device and identification information of the instructions to the relay apparatus, and
an execution confirmation step for retrieving execution status information indicating an execution status of the instructions by using the identification information,
wherein the identification information is unique for each of the instructions, and
the identification information transmitted by an instruction part of the first control apparatus comprises a first sequence number selected from a plurality of first sequence numbers which are assigned to the first control apparatus,
the identification information transmitted by an instruction part of the second control apparatus comprises a second sequence number selected from a plurality of second sequence numbers which are assigned to the second control apparatus, wherein the first sequence numbers are different from the second sequence numbers,
the first sequence number is indicated by the execution confirmation part of the first control apparatus when retrieving the execution status of a first instruction from the first control apparatus during or after the execution of the first instruction, and the second sequence number is indicated by the execution confirmation part of the second control apparatus when retrieving the execution status of a second instruction from the second control apparatus during or after the execution of the second instruction.

10. A control method for a relay apparatus that relays a plurality of instructions between a plurality of control apparatuses and a device operating according to the instructions from the plurality of control apparatuses that comprise a first control apparatus and a second control apparatus, the control method comprising:
an instruction writing step for writing the instructions and identification information of the instructions in a storage area corresponding to the device by way of correlating the instructions and the identification information of the instructions with each other, a status writing step for writing execution status information indicating an execution status of the instructions in the storage area, and a read control step of reading the execution status information stored in the storage area in response to receiving a first command for retrieving the execution status information from the first control apparatus, and reading the execution status information stored in the storage area in response to receiving a second command for retrieving the execution status information from the second control apparatus, wherein the identification information is unique for each of the instructions, when the relay apparatus receives the first command for retrieving the execution status information from the first control apparatus, wherein the first command comprises a first sequence number selected from a plurality of first sequence numbers which are assigned to the first control apparatus,-and the first sequence number is specified when confirming the execution status of the instruction from the first control apparatus during or after the execution of the instruction, the relay apparatus is configured to transmit the execution status information corresponding to the first sequence number to the first control apparatus, and when the relay apparatus receives the second command for retrieving the execution status information from the second control apparatus, wherein the second command comprises a second sequence number selected from a plurality of second sequence numbers which are assigned to the second control apparatus, and the second sequence number is specified when confirming the execution status of the instruction from the second control apparatus during or after the execution of the instruction, the relay apparatus is configured to transmit the execution status information corresponding to the second sequence number to the second control apparatus.

* * * * *